(12) United States Patent
Boileau et al.

(10) Patent No.: US 10,060,495 B2
(45) Date of Patent: Aug. 28, 2018

(54) DRY FRICTION DAMPED MECHANICAL AND STRUCTURAL METAL COMPONENTS AND METHODS OF MANUFACTURING THE SAME

(71) Applicant: Ford Global Technologies, LLC., Dearborn, MI (US)

(72) Inventors: James Maurice Boileau, Novi, MI (US); Yuri Anatoly Karpenko, Brighton, MI (US); J. Chris Oakwood, West Bloomfield, MI (US); Peter Kowalow, Windsor (CA); Laura Dammeyer, Novi, MI (US); Steven Swisher, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/266,229

(22) Filed: Sep. 15, 2016

(65) Prior Publication Data
US 2018/0073588 A1  Mar. 15, 2018

(51) Int. Cl.
*F16D 65/00* (2006.01)
*F16F 7/00* (2006.01)
*B22D 19/14* (2006.01)

(52) U.S. Cl.
CPC ............... *F16F 7/00* (2013.01); *B22D 19/14* (2013.01); *F16F 2222/04* (2013.01); *F16F 2226/00* (2013.01)

(58) Field of Classification Search
CPC ...... F16F 7/00; F16F 2222/04; F16F 2226/00; B22D 19/14; F16D 65/0006; F16D 2250/0015
See application file for complete search history.

(56) References Cited

U.S. PATENT DOCUMENTS

| | | | | |
|---|---|---|---|---|
| 3,286,799 A | * | 11/1966 | Shilton | F16D 65/0006 188/218 A |
| 5,004,078 A | * | 4/1991 | Oono | F16D 65/0006 188/218 A |
| 5,184,663 A | * | 2/1993 | Oono | B22D 19/00 164/112 |
| 5,310,025 A | | 5/1994 | Anderson | |

(Continued)

FOREIGN PATENT DOCUMENTS

GB  934096  8/1963

*Primary Examiner* — Thomas W Irvin
(74) *Attorney, Agent, or Firm* — LeClairRyan

(57) ABSTRACT

A method and system for increasing damping capacity in cast metal parts by utilizing dry friction between individual wires of a sheathed rope is disclosed. The rope is embedded into the part during casting. Sheathing the ropes in a thin layer of the same metal as the casting prevents molten metal from infiltrating individual wires during casting, thus allowing inter-wire friction during the part vibration. There are two ways to distribute the ropes within a part during casting. The first way is to distribute the ropes uniformly across an entire part whereby damping capacity of the metal part increases uniformly as well. The second way of distributing the ropes is to spatially distribute them according to a pattern to increase the damping capacity only in the part regions that have the highest vibration amplitudes or stress during system vibration. Both methods of distribution may be combined in a single part.

13 Claims, 17 Drawing Sheets

(56) References Cited

U.S. PATENT DOCUMENTS

| | | | | |
|---|---|---|---|---|
| 5,358,080 | A * | 10/1994 | Donabedian | F16D 65/125 |
| | | | | 188/18 A |
| 5,855,257 | A * | 1/1999 | Wickert | F16D 65/0006 |
| | | | | 188/218 A |
| 6,112,865 | A * | 9/2000 | Wickert | F16D 65/0006 |
| | | | | 188/218 A |
| 6,151,898 | A | 11/2000 | Hogan | |
| 7,644,750 | B2 | 1/2010 | Schroth et al. | |
| 7,975,750 | B2 | 7/2011 | Dessouki et al. | |
| 8,028,739 | B2 * | 10/2011 | Walker | F16F 7/08 |
| | | | | 164/100 |
| 8,056,233 | B2 | 11/2011 | Carter | |
| 8,104,162 | B2 | 1/2012 | Golden et al. | |
| 8,118,079 | B2 | 2/2012 | Hanna et al. | |
| 8,245,758 | B2 | 8/2012 | Hanna et al. | |
| 8,511,440 | B2 | 8/2013 | Kappagantu | |
| 9,568,062 | B2 * | 2/2017 | Walker | F16F 7/08 |
| 9,714,684 | B2 * | 7/2017 | Badino | F16D 65/0006 |
| 9,841,072 | B2 * | 12/2017 | Karpenko | F16D 65/0006 |
| 2007/0235270 | A1 * | 10/2007 | Miskinis | F16D 65/0006 |
| | | | | 188/218 XL |
| 2013/0256143 | A1 | 10/2013 | Schroth et al. | |
| 2016/0097433 | A1 * | 4/2016 | Karpenko | B22D 19/04 |
| | | | | 188/73.31 |
| 2016/0341269 | A1 * | 11/2016 | Karpenko | B22D 19/04 |

* cited by examiner

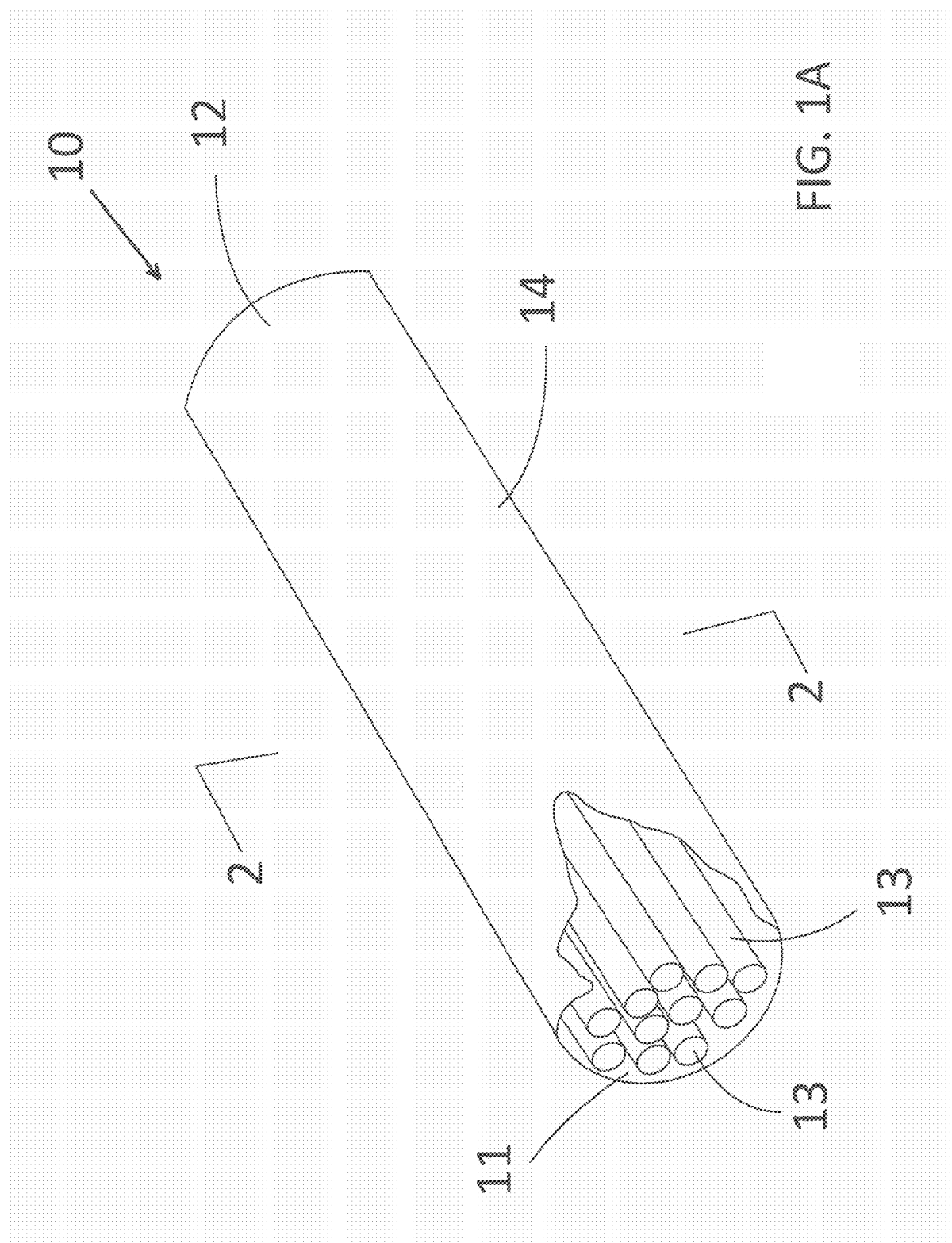

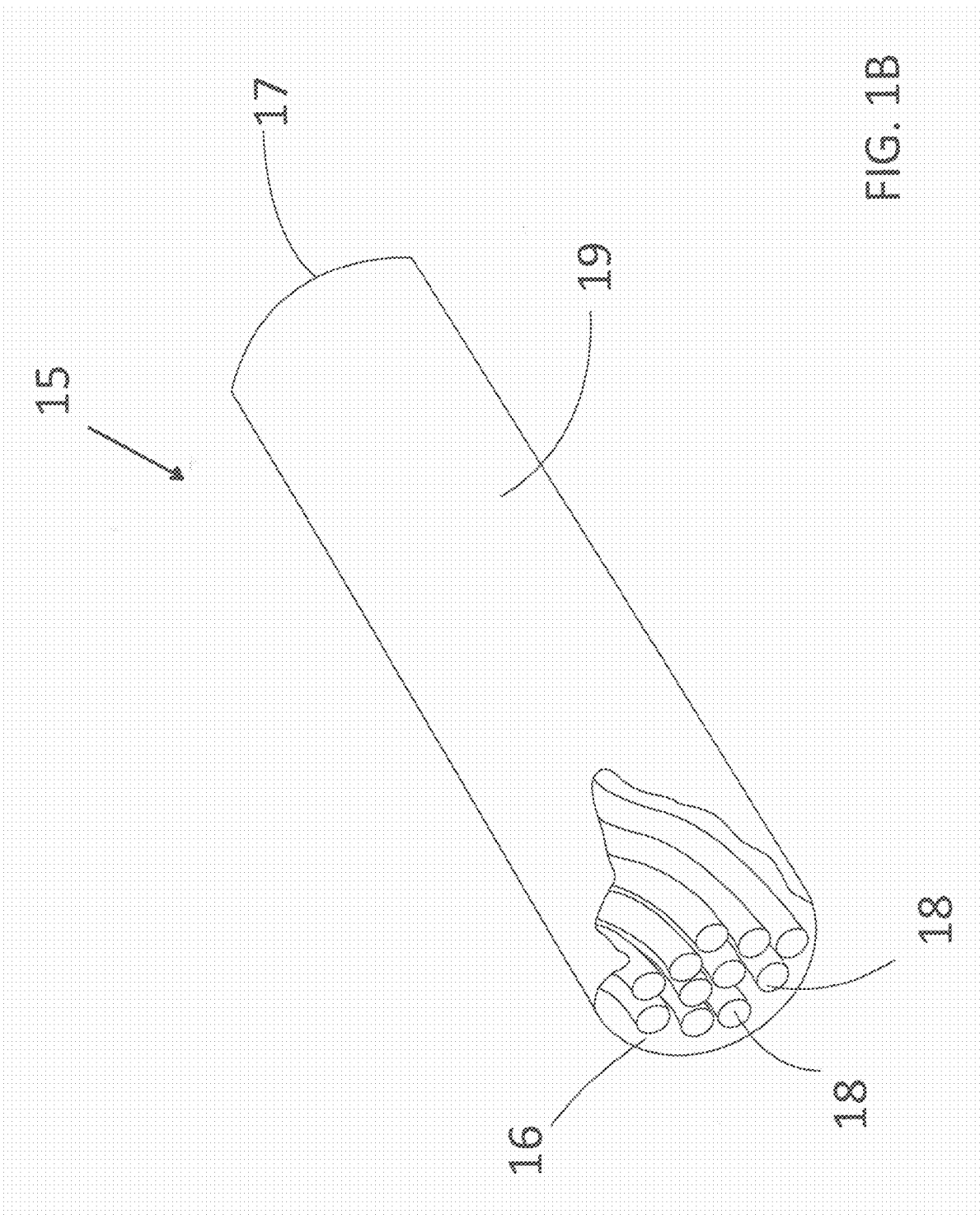

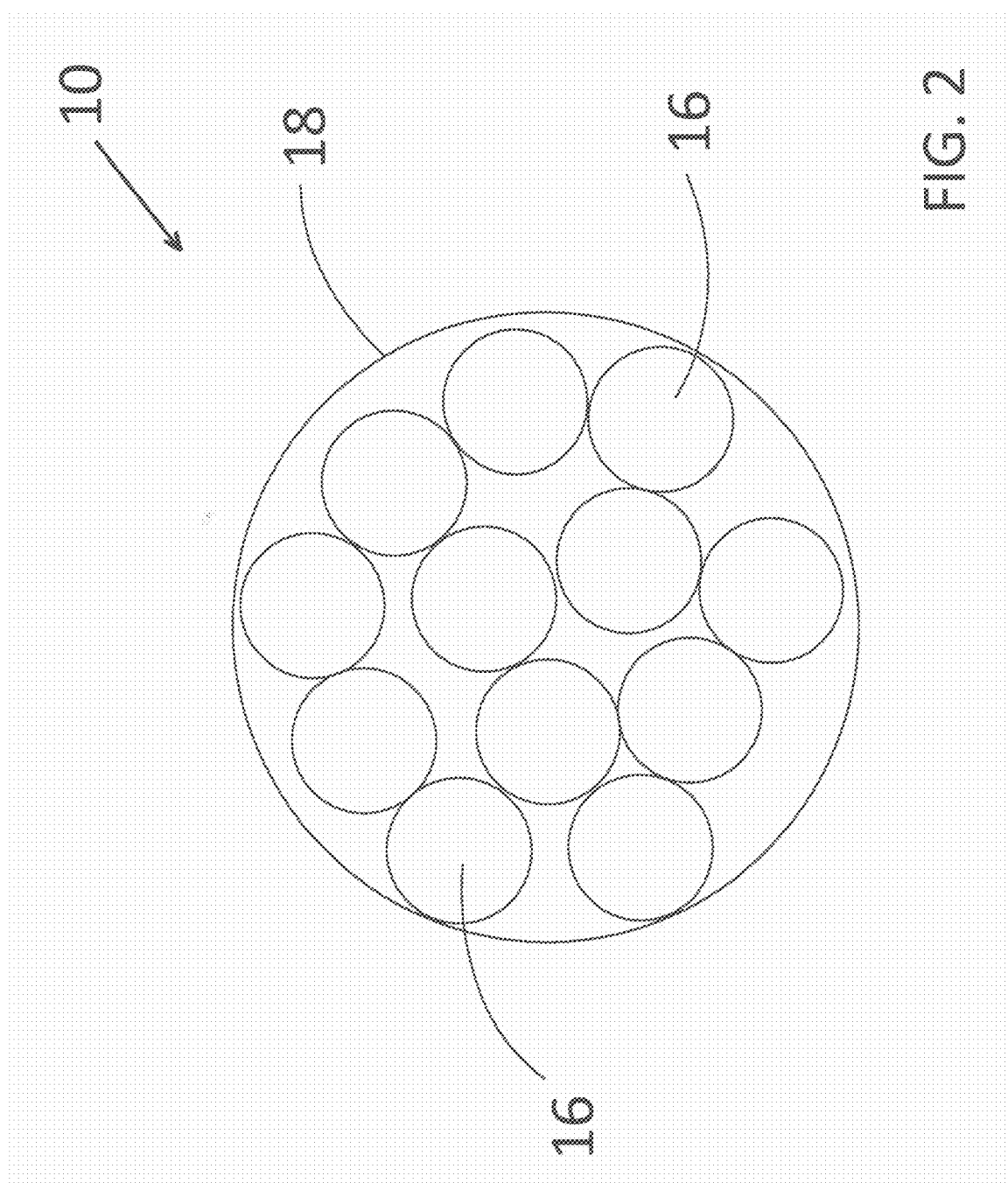

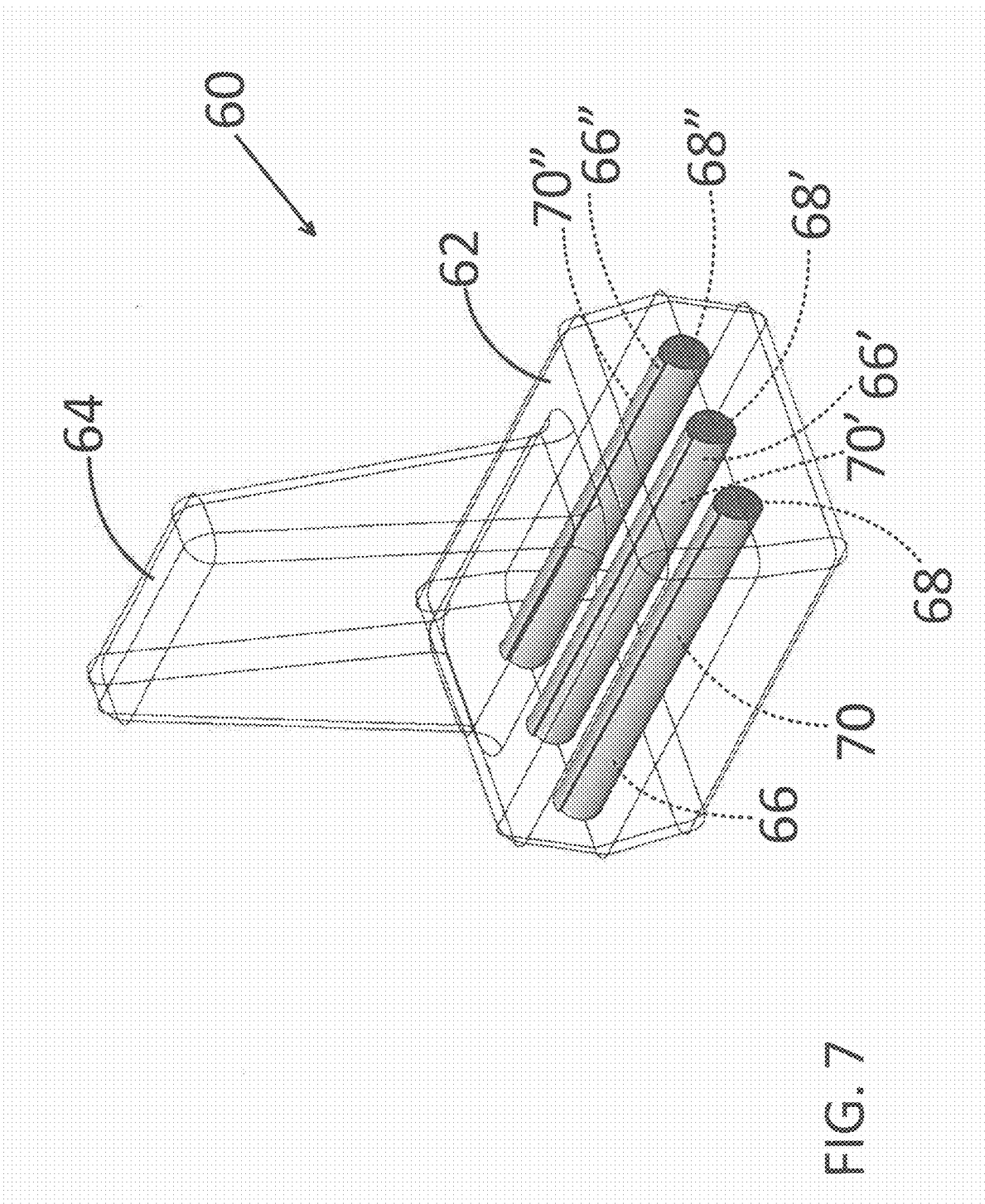

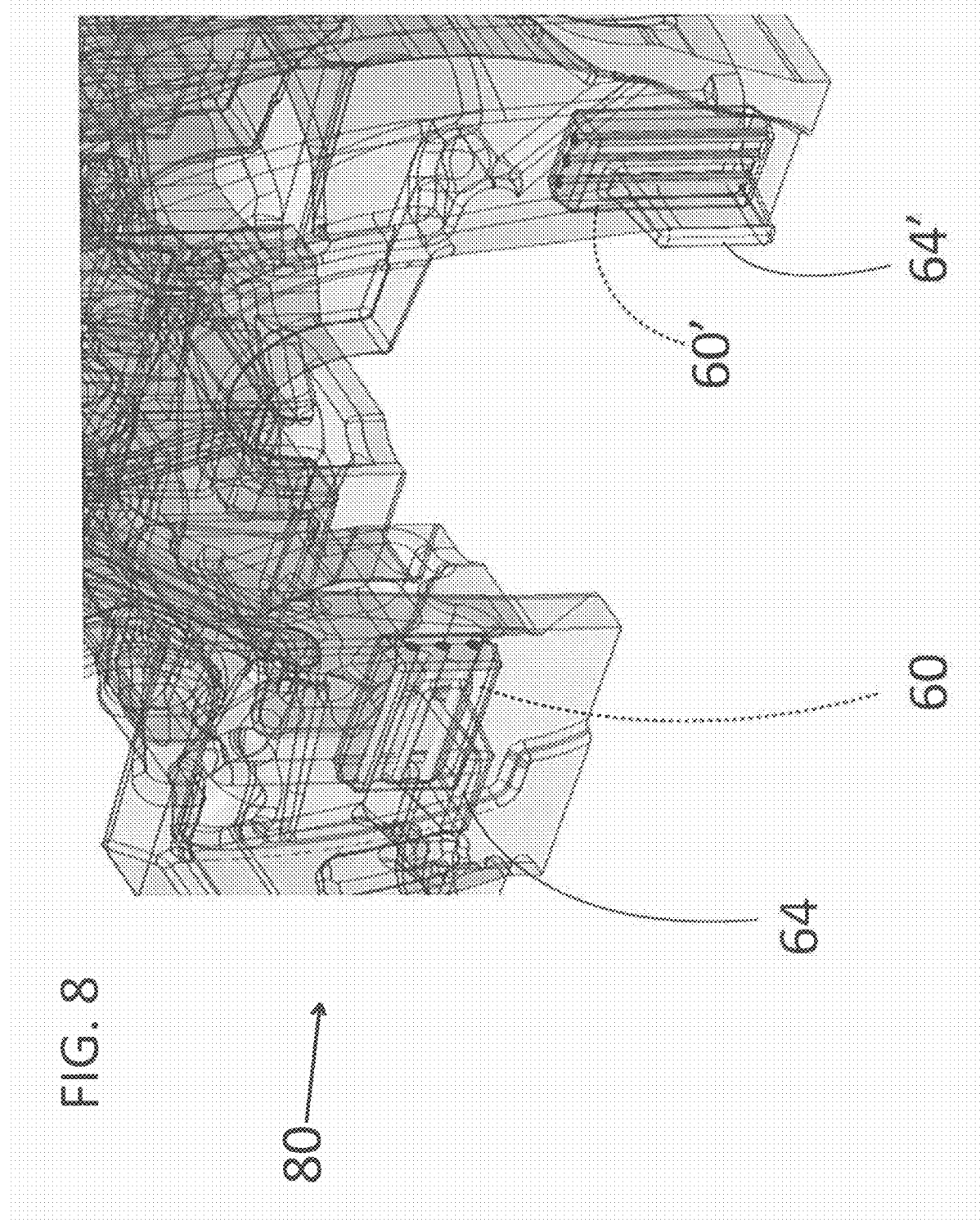

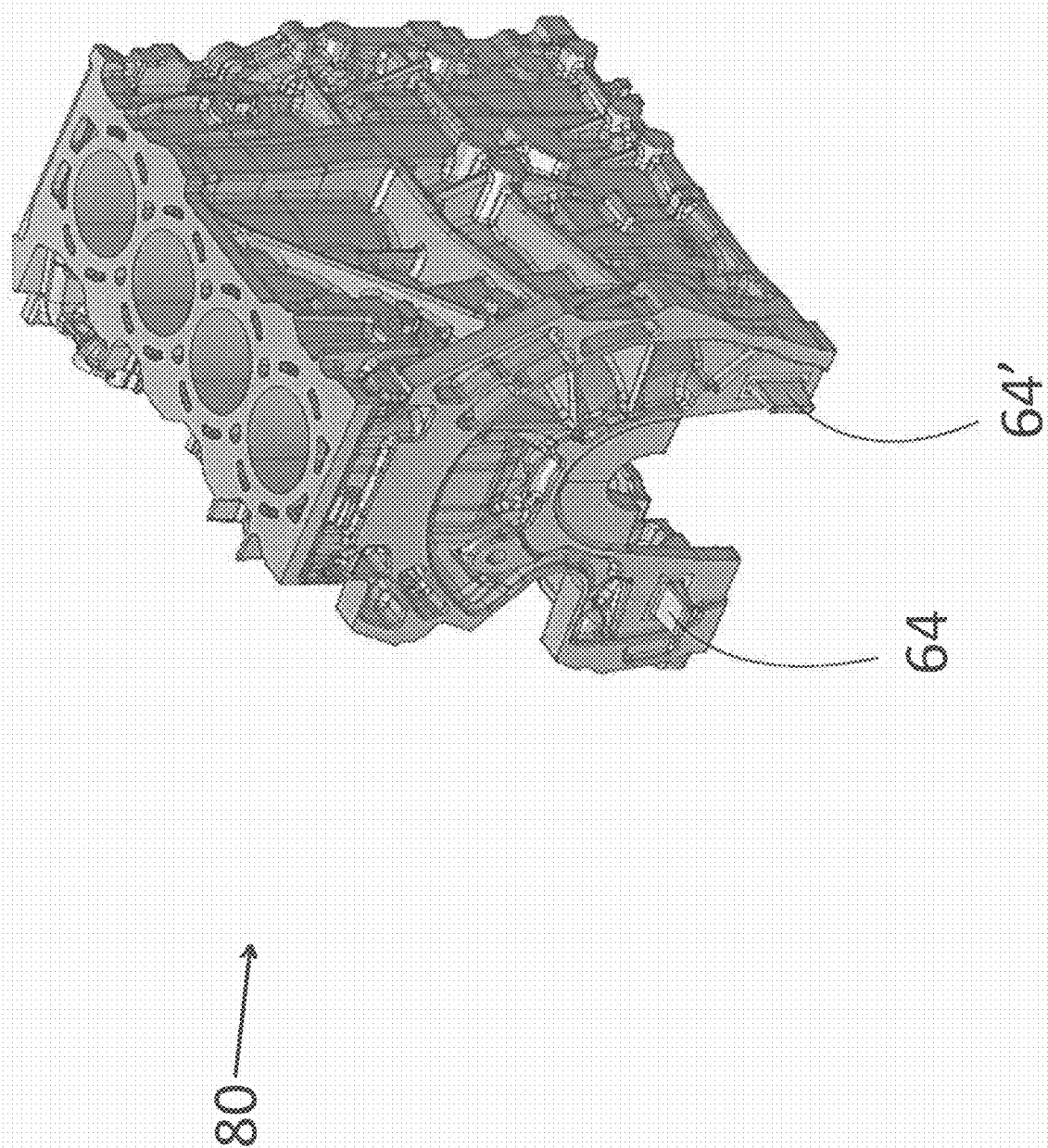

DRY FRICTION DAMPED MECHANICAL AND STRUCTURAL METAL COMPONENTS AND METHODS OF MANUFACTURING THE SAME

TECHNICAL FIELD

The disclosed inventive concept relates to cast metal parts having increased damping capacity. More particularly, the disclosed inventive concept relates to dry friction damped mechanical and structural metal components and methods of manufacturing same. Damping is capacity is increased by providing sheathed cables or ropes comprising plural individual wires that are either linear or twisted relative to one another and are embedded into the part during casting. The strength of the individual wires is preferably higher than that of the casting alloy.

BACKGROUND OF THE INVENTION

Mechanical and structural components such as vehicle suspensions, engine blocks, turbine blades and discs, and support structures for motors, pumps, centrifugal machines and the like are commonly subjected to vibration. When this occurs, these components experience a periodic motion in alternately opposing directions from the position of equilibrium which induces loads that can lead to reduced component life.

In certain engineering systems, for example, those made from plastics, elastomers, or other polymerized materials that inherently have a relatively high damping capacity, the vibrational energy associated with their periodic motion is gradually converted to heat or sound as a result of the internal material damping. Thus the system response, that is, displacement amplitude in its components, gradually decreases, which extends safe and reliable usable operating life.

Conversely, in other engineering material systems having relatively low damping capacity (such as ductile cast iron, aluminum or other cast metals), the decay of vibration amplitude is very slow. As an undesirable consequence, such systems are at a higher risk of failure due to fatigue resulting from cyclic variations of the induced stress. An increase in the damping capacity of a metallic material is highly desired in order to reduce overall vibration and, ultimately, system failure.

There are two general groups of contacts that generate friction damping. The first group includes contact between nominally conforming surfaces that do not have a relative rigid-body motion between the surfaces. This is the case of bolted or riveted joints, braided wire ropes, and gas turbine blades. The second group includes contacting surfaces that also have a relative whole-body motion. This is the case of damper rings in gears (solid inserts in brake rotors and damper rings in a brake rotor) and so-called "beanbag" dampers consisting of granular materials (including a body with a filler and loose-mass damper system in brake rotors).

In the first case, relative motion, sometimes referred to as micromotion, may not reach slip conditions, and friction remains in the "static" range associated with tangential stiffness. In the second case, full slip can develop between the surfaces. In any type of contact, friction damping has a preferred range of contact force (contact pressure) within which it becomes most effective. Below such an optimum range, excess relative motion at the interface develops without significant energy dissipation. Above the optimum range, excess contact pressure limits the development of relative motion for friction to act as an effective damper.

Contact pressure between two surfaces depends on their contact geometry and elastic properties which are known to change with surface temperature and temperature gradients. The operating temperature range for metal parts is very wide (from −40° C. after overnight soaks outside in cold climate areas during winter time up to 500° C., e.g., during an operation near the open sources of heat or inside the engine block). Since unwanted metal part failure due to fatigue might occur during any temperature conditions, the change in friction damper effectiveness with the part temperature should be minimized.

Existing technology for friction dampers for metal parts cannot achieve this goal since current knowledge assumes a constant full slip condition between, for example, a rotor and insert surfaces or between insert and filler surfaces. In reality, the full slip condition between the part and insert surfaces or between insert and filler surfaces may change with a change in the part temperature due to unavoidable thermal distortion of the sliding interface resulting in a change in contact pressure from its desired optimal value. Since even a relatively small distortion of an interface between the solid bodies (i.e., continuous inserts) may result in a significant change in contact pressure between them, the deviation of contact pressure from its optimal value may be very large compromising friction damper effectiveness.

In view of the state of the art, it may be advantageous to provide cast mechanical and structural components with appropriate cast-in components that aid in damping. As in so many areas of manufacturing technology, there is always room for improvement related to friction damping relative to interacting mechanical and structural components.

SUMMARY OF THE INVENTION

The disclosed inventive concept provides a method and system for increasing damping capacity in cast metal parts by utilizing dry friction between individual wires of a rope wrapped in a thin metal layer. The wrapped rope is embedded into the part during the casting process. The individual wires allow inter-wire friction to occur during part vibration. Wrapping (or sheathing) the ropes in a thin layer of a suitable metal having a melting point equal to or greater than that of the casting alloy prevents molten metal from infiltrating individual wires during the casting process, thus allowing the desired inter-wire friction to be experienced during the part vibration. The strength of the individual wires is preferably higher than that of the casting alloy, thereby increasing the amount of friction damping that the inter-wire friction provides to the damped metal component.

There are two primary ways to distribute the ropes within a metal part during casting according to the disclosed inventive concept. The first way is to distribute the ropes uniformly across an entire part at select locations. Correspondingly, the damping capacity of the metal part increases uniformly as well. The second way of distributing the ropes in the metal part is to spatially distribute them following a specific pattern to increase the damping capacity only in the part regions that have the highest vibration amplitudes or stress during system vibration. Depending on the application, a combination of two ways for spatial distribution of the ropes is also possible.

The first way of producing a frictionally damped mechanical part according to the disclosed inventive concept incorporates continuous wrapped metal ropes formed into specific shapes which are strategically positioned within a part mold prior to the casting process. To ensure stability of the wrapped ropes within the mold during the casting process, the ropes are supported with tabs made of a suitable metal having a melting point equal to or greater than that of the casting alloy.

The second way of producing a frictionally damped mechanical part according to the disclosed inventive concept is directed to parts for which only specific regions may experience high levels of vibration during usage. In such cases, the sheathed metal ropes are first positioned within a purpose-built mold to produce a cast frictionally damped insert. The insert shape is itself defined by the geometry of the region that may experience the highest vibration levels. The wrapped ropes are positioned in such a way as to maximize friction damping within the insert. After the casting is complete, the frictionally damped insert is put inside the entire metal part mold where it is supported with tabs made of the same metal as was used in the casting process. Again, the tabs are preferably made from a suitable metal that has a melting point equal to or greater than that of the casting alloy.

The use of embedded ropes as friction dampers for metal parts by relying on the "static" inter-wire friction force to dampen the undesired metal part vibration helps to minimize the impact of the friction damper thermal distortions with the part temperature. Due to its flexible structure, the ropes can undergo relatively large elastic distortions without any noticeable change in contact pressure between the individual wires. Thus, disclosed inventive concept delivers stable damping properties for many metals over the wide range of operating temperatures. One or both versions of the proposed inventive concept may be applied to a broad variety of structures including, without limitation, vehicle suspensions, engine blocks, gas turbines, wind mills, jet engines, building vibrations, or virtually any engineering component exposed to vibration.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1A is a perspective view of linear wires wrapped in a thin metal layer to form a vibration-damping rope according to one embodiment of the disclosed inventive concept;

FIG. 1B is a perspective view of twisted wires wrapped in a thin metal layer to form a vibration-damping rope according to another embodiment of the disclosed inventive concept;

FIG. 2 is a cross-sectional view of the wrapped, vibration-damping rope taken along line 2-2 of FIG. 1A;

FIG. 7 is perspective view of a purpose-designed formed insert shown in shadow lines illustrating vibration-damping ropes embedded therein;

FIG. 8 is a portion of an engine block shown in shadow lines illustrating the inserts of FIG. 7 strategically positioned therein;

FIG. 9 is a perspective view of an engine block having the inserts of FIG. 7 shown with their insert locators extending therefrom before machining;

DETAILED DESCRIPTION OF THE PREFERRED EMBODIMENT

Figure 3:
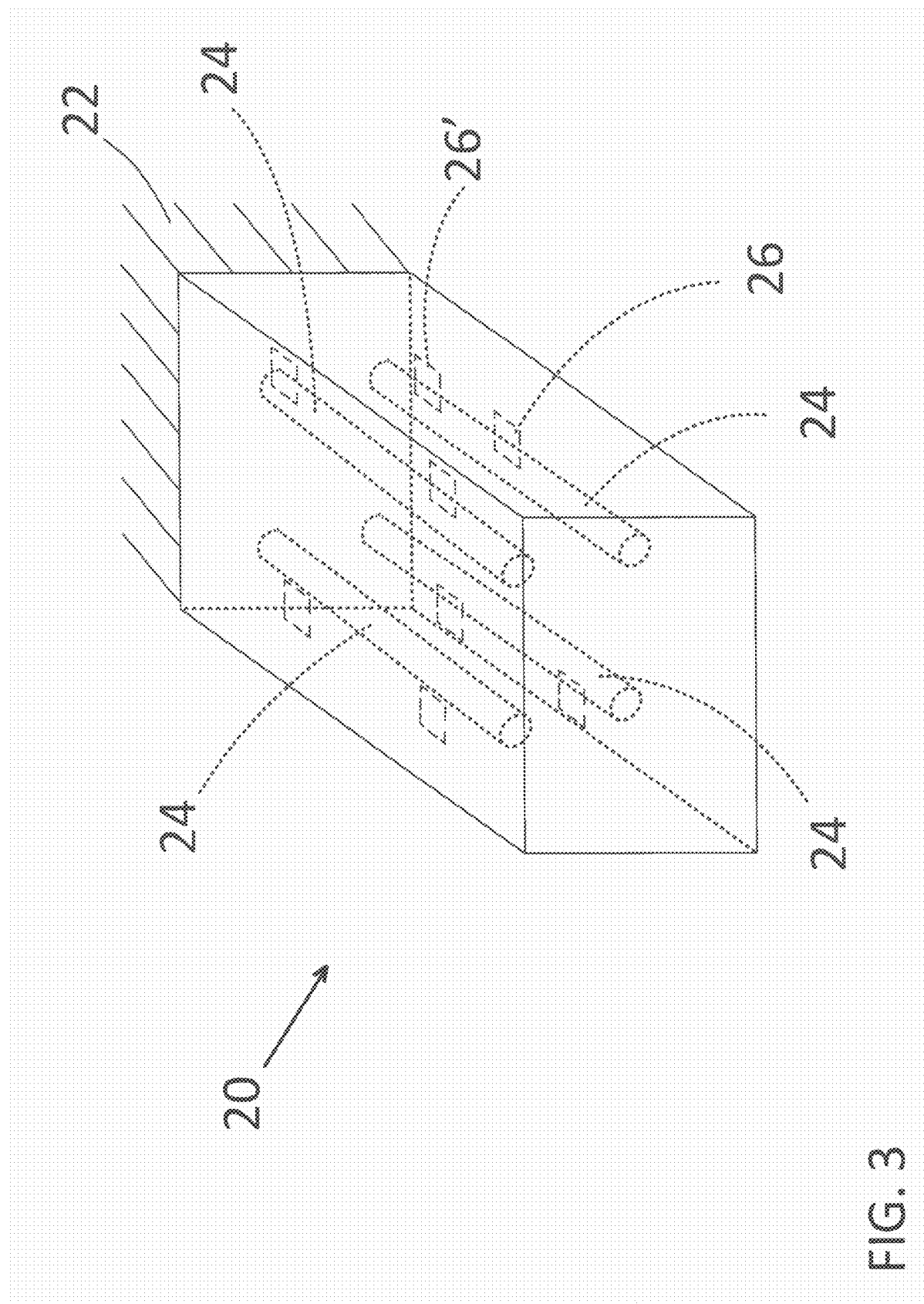
FIG. 3 is a diagrammatic view of a hypothetical part containing strategically-located wrapped, vibration-damping ropes according to the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 11:
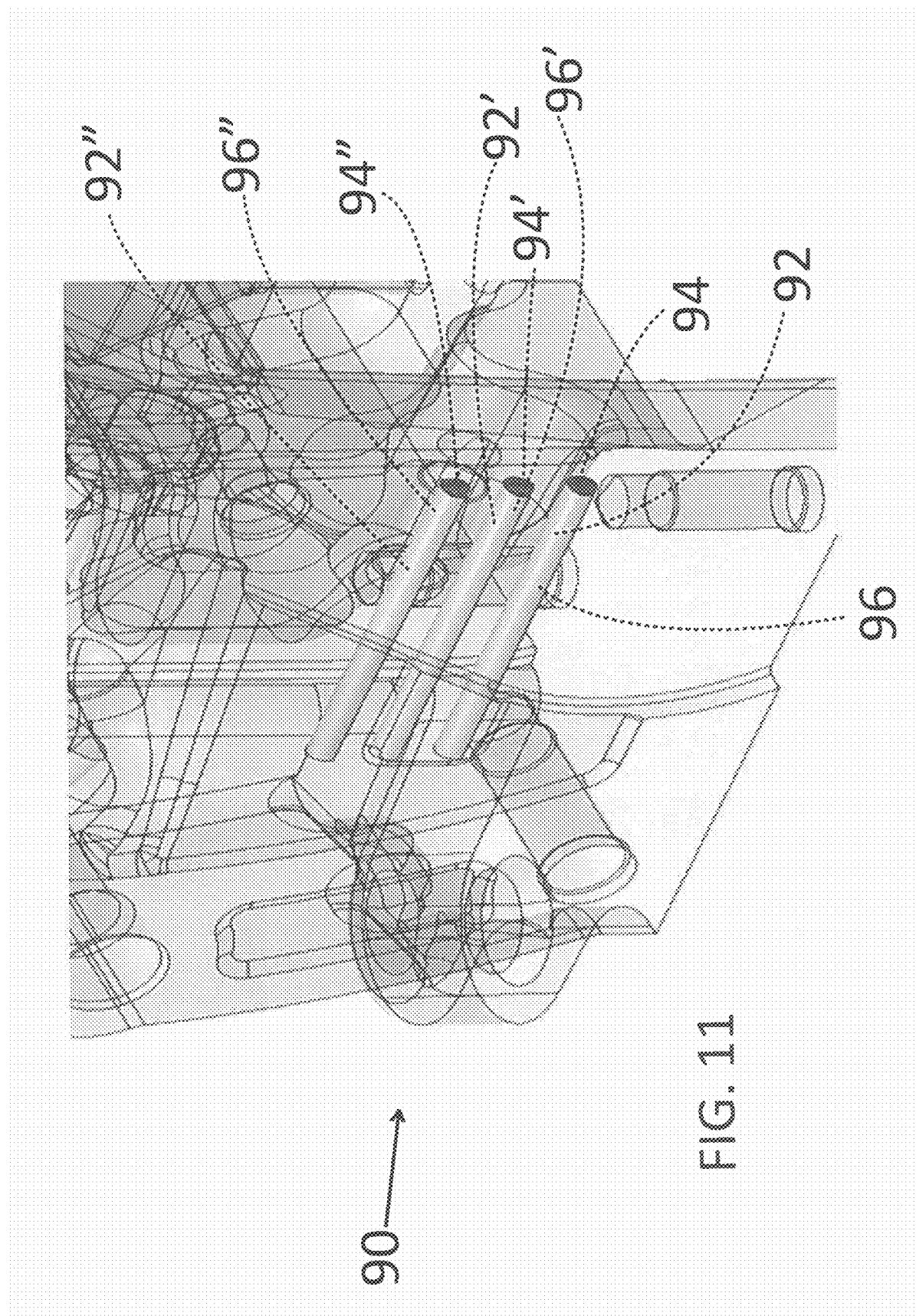
FIG. 11 is a portion of an engine block shown in shadow lines illustrating strategically located vibration-damping ropes positioned therein.
Figure 12:
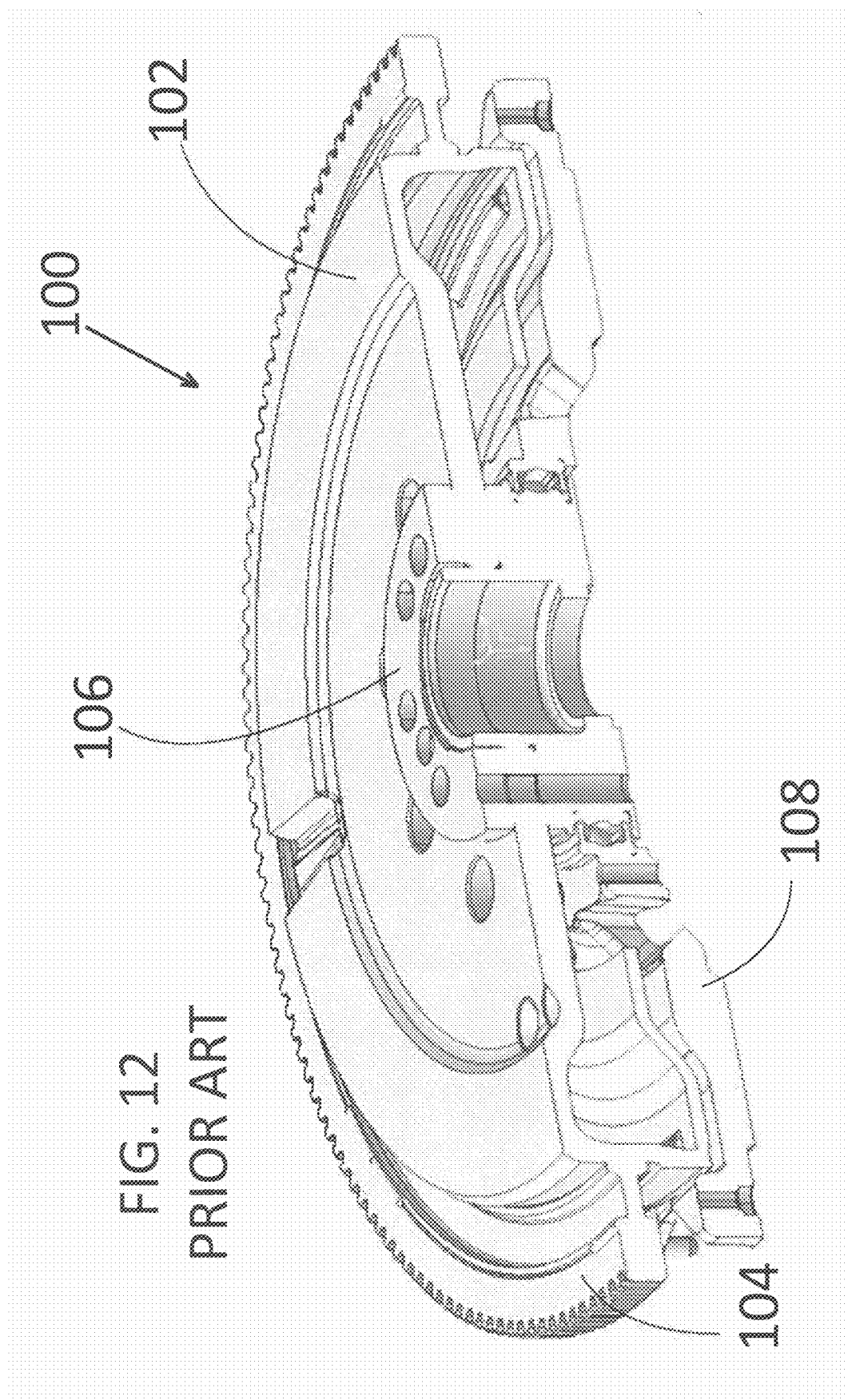
FIG. 12 is a sectional view of a flywheel for use with an engine according to known technology.
Figure 13:
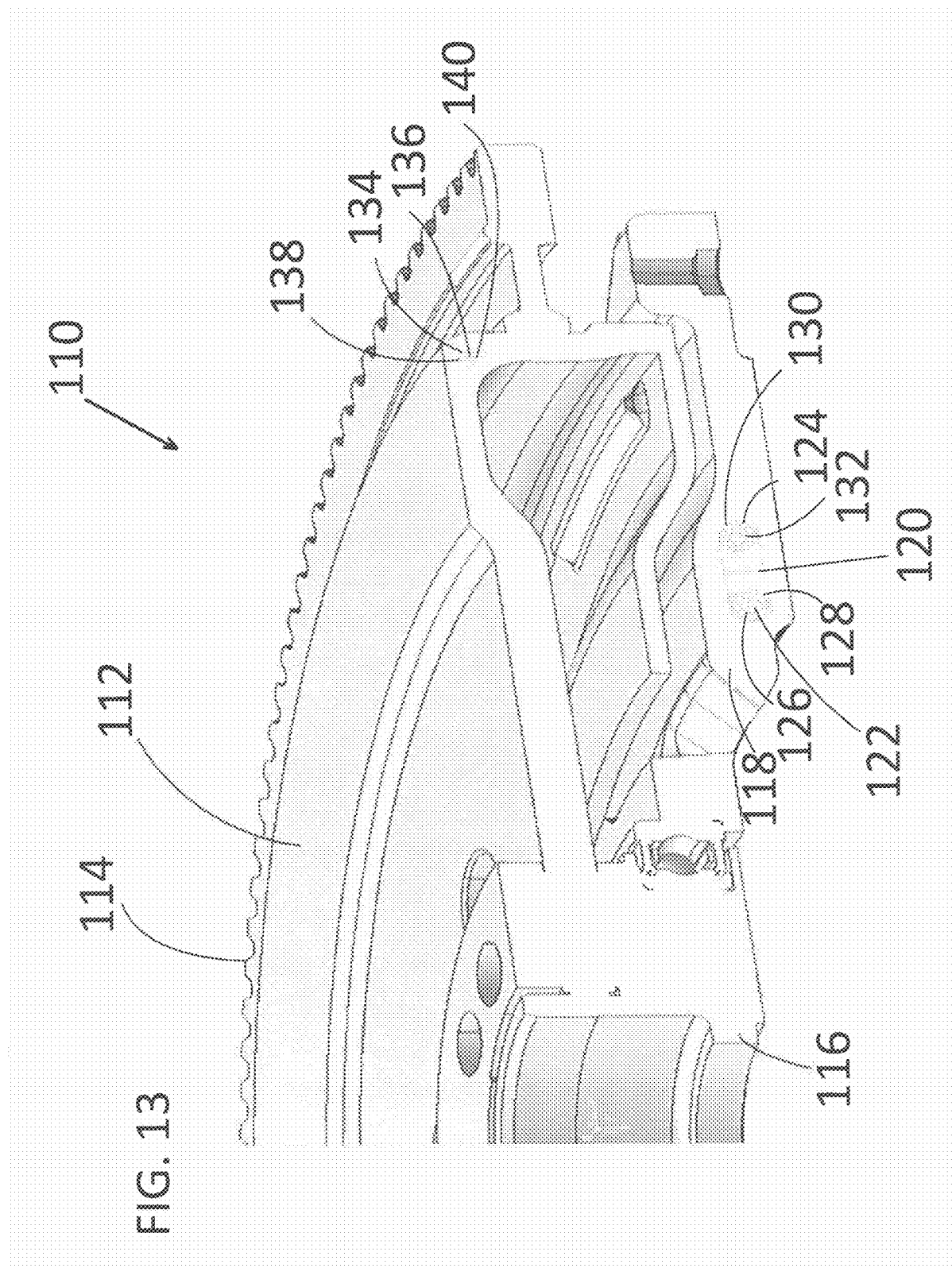
FIG. 13 is a sectional view of a flywheel for use with an engine according to the disclosed inventive concept in which vibration-damping ropes are strategically located.

The accompanying figures and the associated description illustrate the construction and use of vibration-damping ropes according to the disclosed inventive concept. Particularly, FIGS. 1A, 1B and 2 illustrate the vibration-damping rope itself. FIG. 3 illustrates the vibration-damping rope used in a generic component. FIGS. 4A-6B illustrate the vibration-damping rope employed in a brake rotor as an example of how the rope can be used in a component to dampen vibration. FIGS. 7-10 illustrate the vibration-damping rope employed indirectly in an engine block by way of first being formed as part of an insert. The insert is thereafter incorporated into the engine block. FIG. 11 illustrates the use of vibration-damping ropes directly in an engine block without first being formed in an insert. And FIG. 12 illustrates a flywheel according to the prior art in which no damping system is employed while FIG. 13 illustrates a flywheel having inserts that include vibration-damping ropes according to another embodiment of the disclosed inventive concept.

Referring to FIGS. 1A, 1B, and 2, a vibration-damping rope is shown. FIGS. 1A and 1B illustrate the vibration-damping rope in a perspective, partially sectional view according to two embodiments of the disclosed inventive concept. FIG. 2 illustrates the vibration-damping rope in a sectional view taken along line 2-2 of FIG. 1A.

Referring to FIG. 1A, a vibration-damping rope, generally illustrated as 10, includes a first end 11 and a second end 12 according to one embodiment of the disclosed inventive concept. The vibration-damping rope 10 includes a plurality of wires 13 wrapped or otherwise encased in a metal sheathing 14. According to this embodiment, the wires 13 are provided in a linear arrangement as illustrated in FIG. 1A.

Referring to FIG. 1B, a vibration-damping rope, generally illustrated as 15, includes a first end 16 and a second end 17 according to another embodiment of the disclosed inventive concept. The vibration-damping rope 15 includes a plurality of wires 18 wrapped or otherwise encased in a metal sheathing 19. According to this embodiment, the wires 18 are twisted in a helical fashion as illustrated in FIG. 1B.

The length and diameter of the vibration-damping rope shown in FIGS. 1A, 1B, and 2 as well as in other figures are only suggestive and are not intended as being limiting. Similarly, the number, diameter, and internal configuration (such as, but not limited to, linear or helical) of the wires as illustrated are also only suggestive. A greater or lesser number of wires may be incorporated. By adjusting the length and diameter of the individual vibration-damping rope and by adjusting the number, diameter, and internal configuration of the wires, the vibration-damping rope according to the disclosed inventive concept may be virtually infinitely tuned for a broad variety of applications.

The wires are preferably made of steel although other metals may be selected for this use. The wires within the vibration-damping rope may be made of the same metal or of different metals. The metal sheathing is preferably although not absolutely formed from the same material as the component in which it is cast.

The vibration-damping rope of the disclosed inventive concept has virtually unlimited applications and may be employed in any metal component regardless of shape and application. Because of the many conceivable variations of rope length and diameter, it may be adapted for a virtually unlimited number of uses without compromising its dampening effectiveness. Accordingly, so as not to limit the broad use of the invention as a vibration dampener according to the disclosed inventive concept, the vibration-damping rope of the disclosed inventive concept is illustrated in use in a hypothetical part in FIG. 3.

With reference thereto, a hypothetical part 20 is illustrated in perspective view. The hypothetical part 20 may be virtually any part in which vibration dampening is desired, such as a support structure or cantilevered beam. The hypothetical part 20 is attached to a base 22 of any type. A plurality of continuous vibration-damping ropes 24 for friction damping is disposed within the hypothetical part 20. To assure that each continuous rope 24 is properly positioned in the final cast hypothetical part 20, each vibration-damping rope 24 is fitted with one or more insert locators, such as insert locators 26 and 26'. The insert locators 26 and 26' are used to locate each of the rope relative to the mold (not shown) prior to the mold being filled with flowing metal.

As noted above, the vibration-damping ropes of the disclosed inventive concept have a virtually unlimited number of specific uses. Such uses include, but are not limited to, vehicle brake rotors, engine blocks and flywheels. Each of these applications is illustrated and discussed hereafter.

Figure 4A:
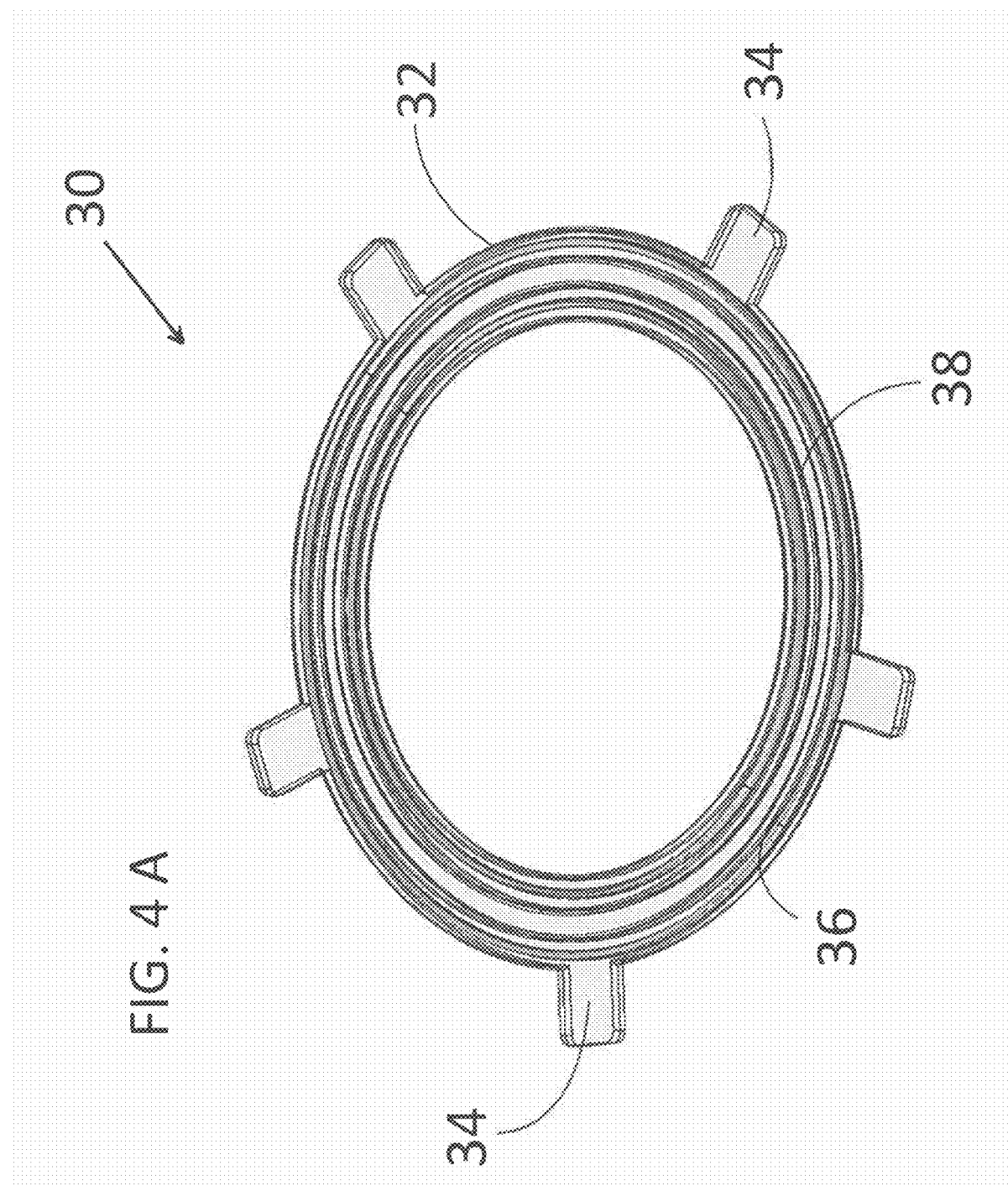
FIG. 4A is perspective view of a rotor insert having vibration-damping ropes according to the disclosed inventive concept disposed therein.

The use of vibration-damping ropes in a brake rotor is illustrated in FIGS. 4A-6B through different stages of component production. Referring to FIG. 4A, a perspective view of a brake rotor insert 30 is illustrated. The brake rotor insert 30 includes a cast body 32 from which outwardly extend insert locators 34. The width and thickness of the brake rotor insert 30 may be other than as illustrated. The number, size and placement of the insert locators 34 may also be other than that as illustrated.

Embedded within the brake rotor insert 30 is at least one vibration-damping rope. Preferably though not absolutely, two vibration damping ropes are provided in a ring form, including an outer vibration-damping rope 36 and an inner vibration-damping rope 38.

Figure 4B:
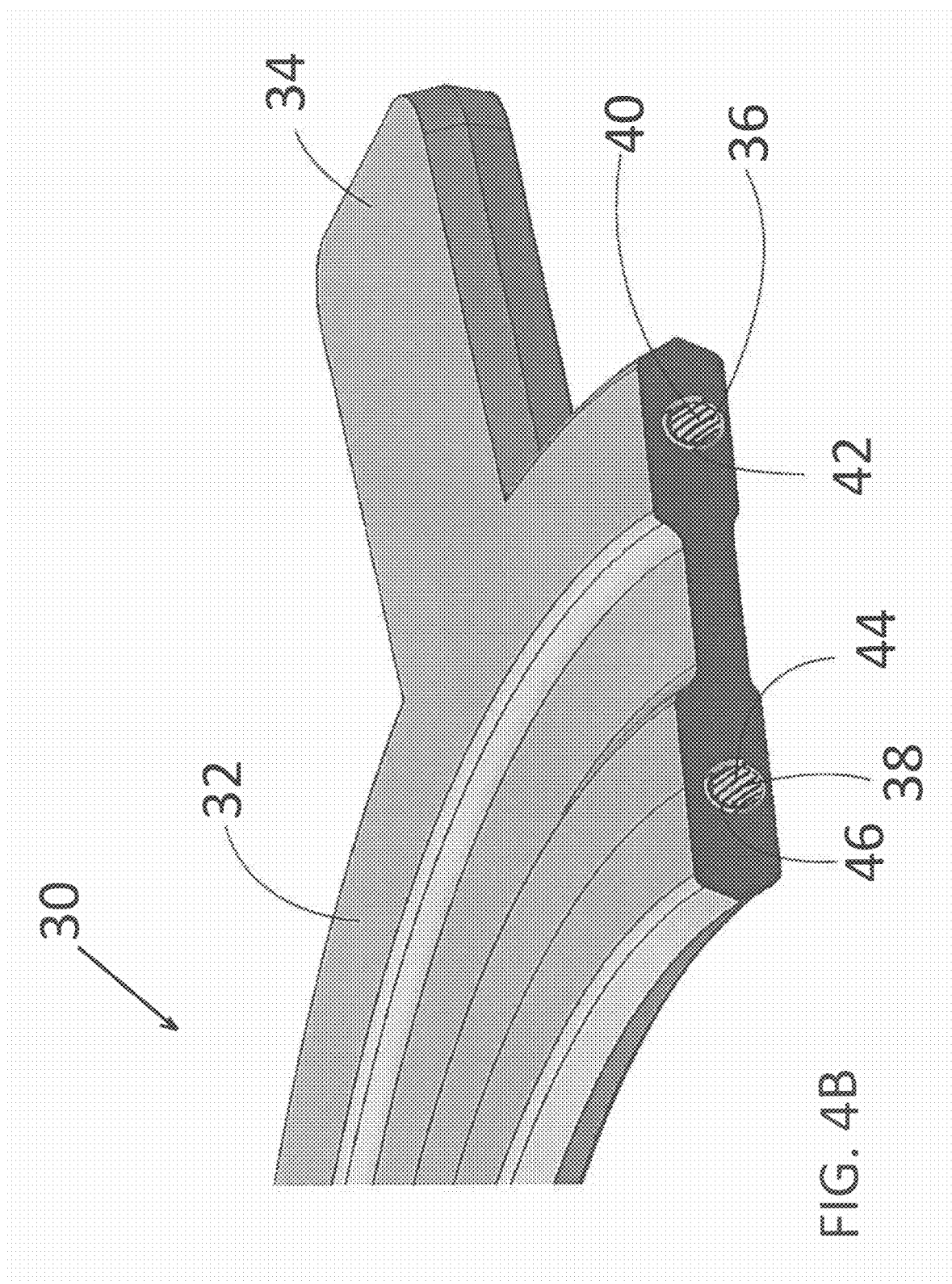
FIG. 4B is a sectional view of the rotor insert of FIG. 4A.

Referring to FIG. 4B, the brake rotor insert 30 is illustrated in sectional view so as to illustrate the placement and composition of the outer vibration-damping rope 36 and the inner vibration-damping rope 38. The outer vibration-damping rope 36 includes a plurality of wires 40 encased in a metal sheathing 42 formed thereover to encase the wires 40. The inner vibration-damping rope 38 includes a plurality of wires 44 encased in a metal sheathing 46 formed thereover to encase the wires 44.

Figure 5A:
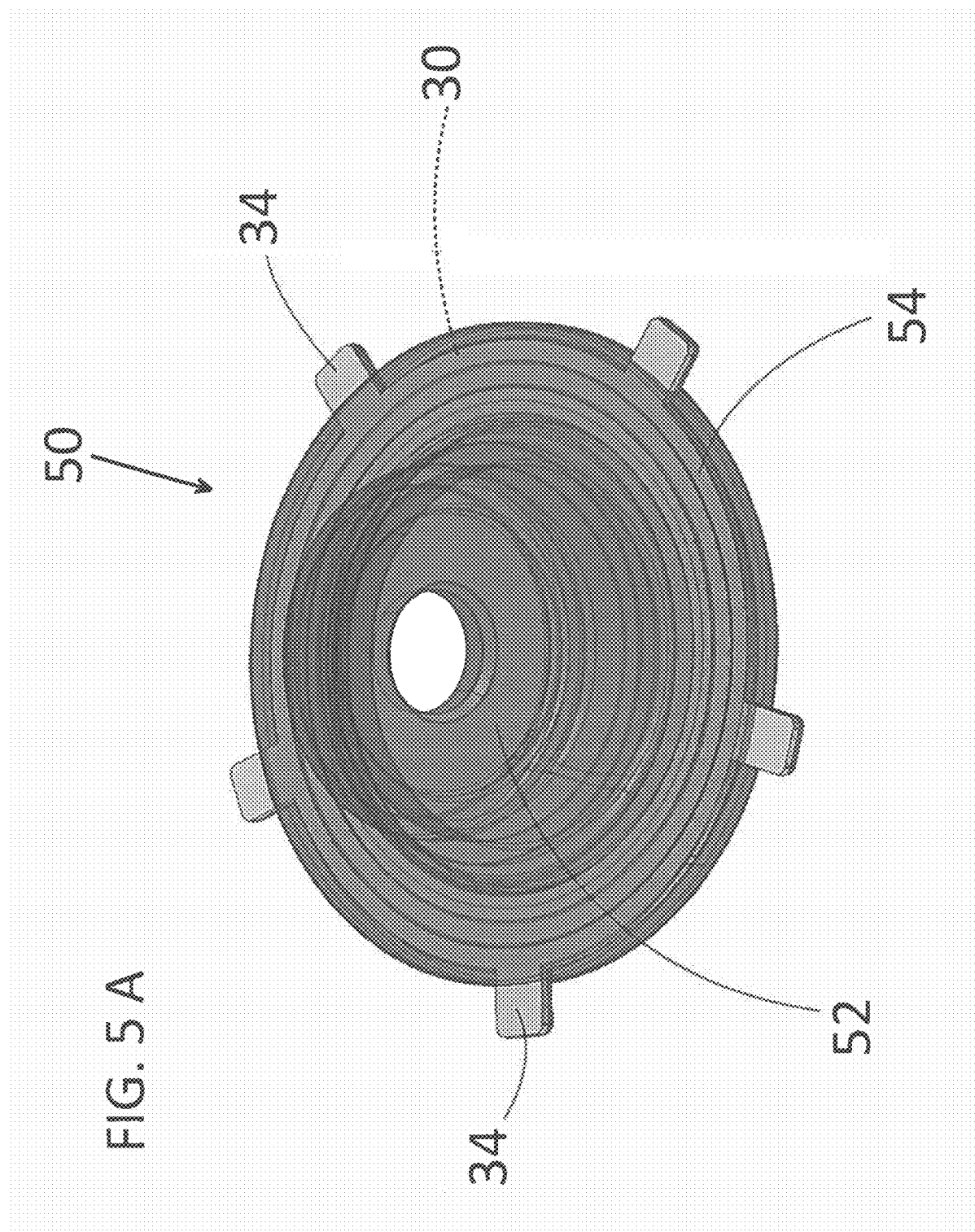
FIG. 5A is a perspective view of a rotor having the rotor insert of FIGS. 4A and 4B cast therein.
Figure 5:
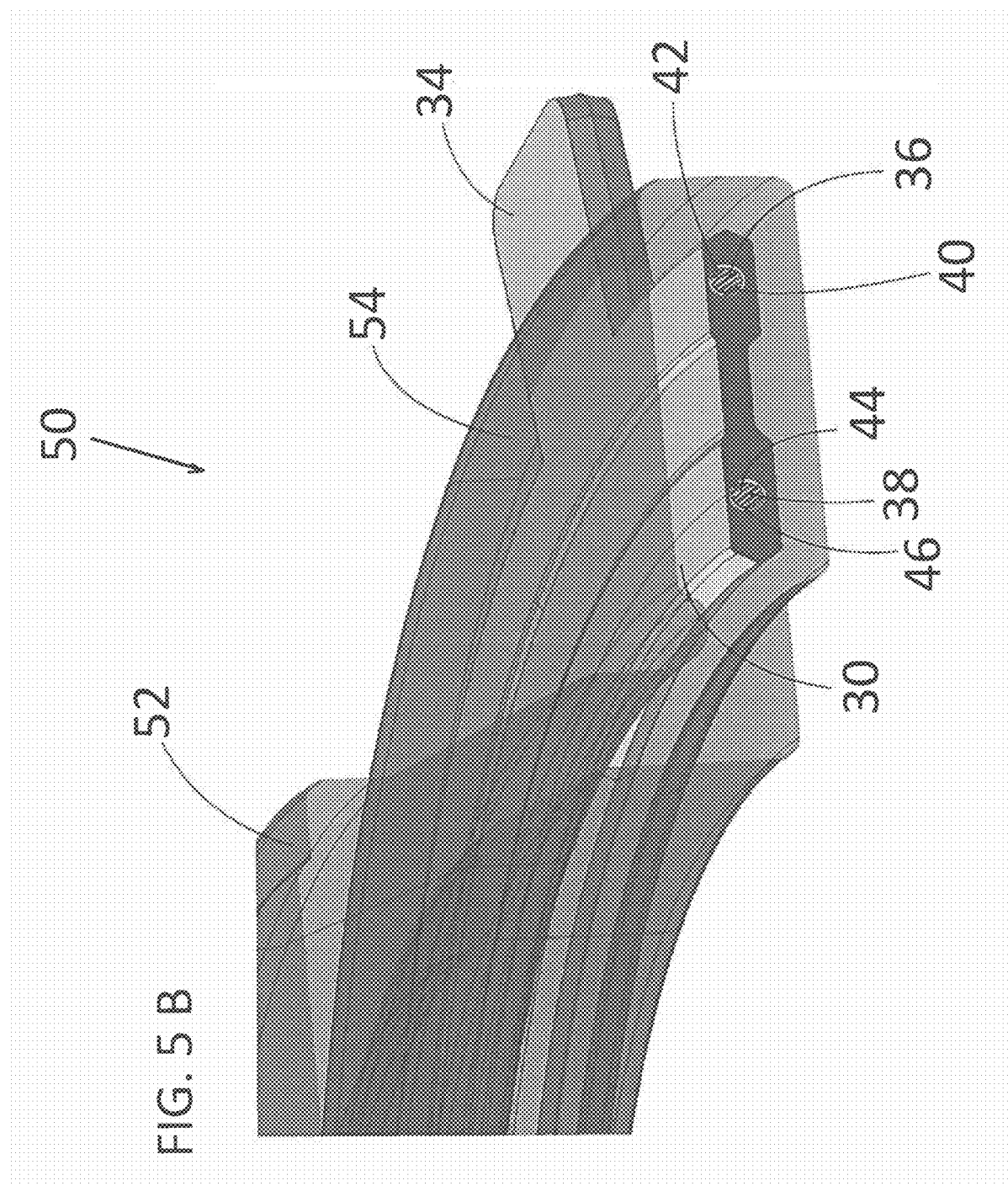
FIG. 5B is a sectional view of the rotor of FIG. 5A.

Once the brake rotor insert 30 is formed, it is positioned within a brake rotor mold (not shown) with the insert locators 34 extending between the two mold halves. The insert locators 34 assure that the brake rotor insert 30 will be properly positioned within the mold before and during the casting operation. FIG. 5A illustrates a completed rough rotor casting 50. The rotor casting 50 includes a hub 52 and a rotor disk 54. Embedded within the rotor casting 50 is the brake rotor insert 30. As illustrated, the insert locators 34 extend beyond the outer periphery of the rotor disk 54. FIG. 5B illustrates a sectional view of the rotor casting 50 whereby the brake rotor insert 30 may be readily observed properly positioned within the rotor disk 54 with a generally equal amount of cast material appearing on both sides of the brake rotor insert 30, thus confirming that the brake rotor insert 30 is in its proper position within the rotor casting 50.

Figure 6A:
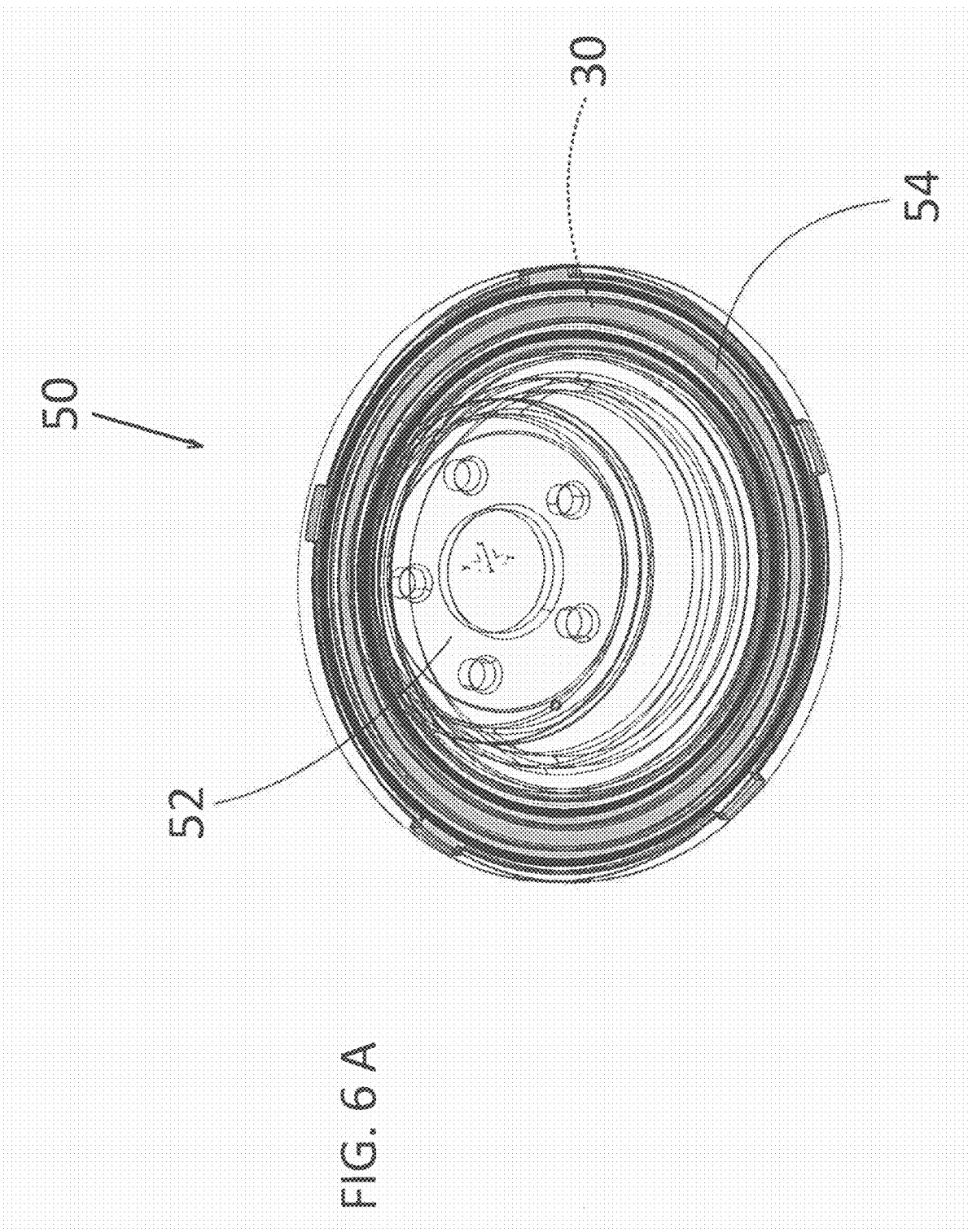
FIG. 6A is perspective view of the rotor of FIGS. 5A and 5B after machining.
Figure 6B:
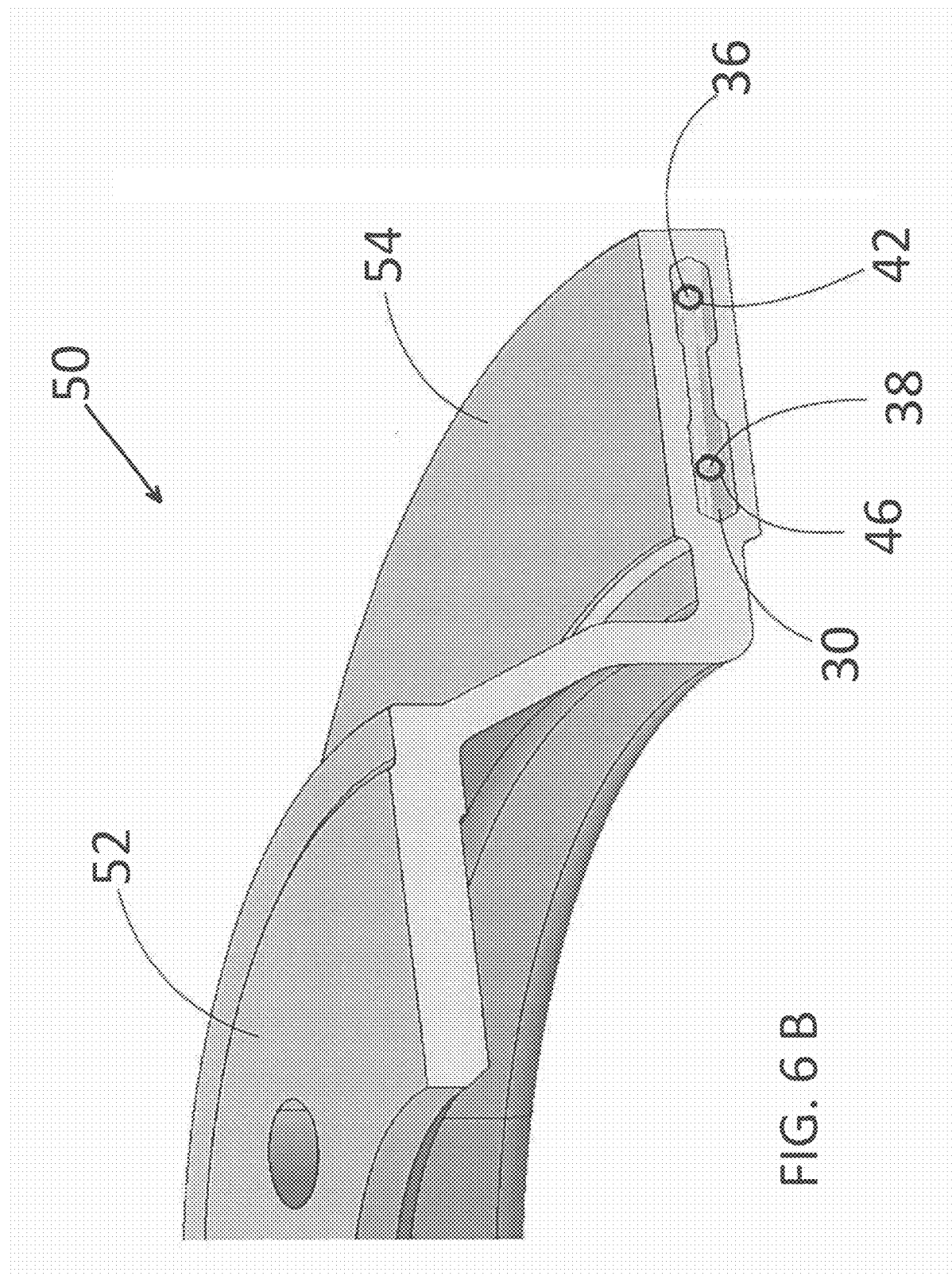
FIG. 6B is a sectional view of the rotor of FIG. 6A.

After the rotor casting 50 is formed, the portions of the insert locators 34 that extend beyond the periphery of the rotor disk 54 are removed as shown in FIG. 6A and the rotor casting 50 is machined so as to produce a final brake rotor that is ready for use in a vehicle. FIG. 6B illustrates the finished rotor casting 50 in sectional view, again illustrating proper placement of the brake rotor insert 30 within the brake rotor casting 50.

The use of vibration-damping ropes in an engine block is illustrated in FIGS. 7-10 through different stages of component production. Referring to FIG. 7, a vibration-damping rope insert 60 is illustrated. The vibration-damping rope insert 60 includes an insert body 62 having an insert locator 64 extending therefrom. The position of the insert locator 64 relative to the insert body 62 as illustrated is suggestive and is not intended as being limiting. The insert body 62 is formed around one or more vibration-damping ropes. Three vibration-damping ropes 66, 66' and 66" are provided within the vibration-damping rope insert 60, although a greater or lesser number of ropes may be used. The vibration-damping ropes 66, 66' and 66" are generally positioned along the long axis of the insert body 62. The vibration-damping rope 66 includes a plurality of wires 68 wrapped or otherwise encased in a metal sheathing 70. The vibration-damping rope 66' includes a plurality of wires 68' wrapped or otherwise encased in a metal sheathing 70'. And the vibration-damping rope 66" includes a plurality of wires 68" wrapped or otherwise encased in a metal sheathing 70".

Two vibration-damping rope inserts, insert 60 and insert 60', are shown as being positioned in an engine block 80 in FIGS. 7-10. However, it is to be understood that the vibration-damping rope insert of the disclosed inventive concept may find suitable application in virtually any cast part. Accordingly, the illustrated and discussed use of the vibration-damping ropes insert in an engine block is suggestive and is not intended as being limiting. In addition, while it is shown in FIGS. 7-10 that two inserts are used, a greater or lesser number of inserts may be employed depending on a variety of factors, including the size of the cast component and the degree of vibration to be dampened.

Figure 10:
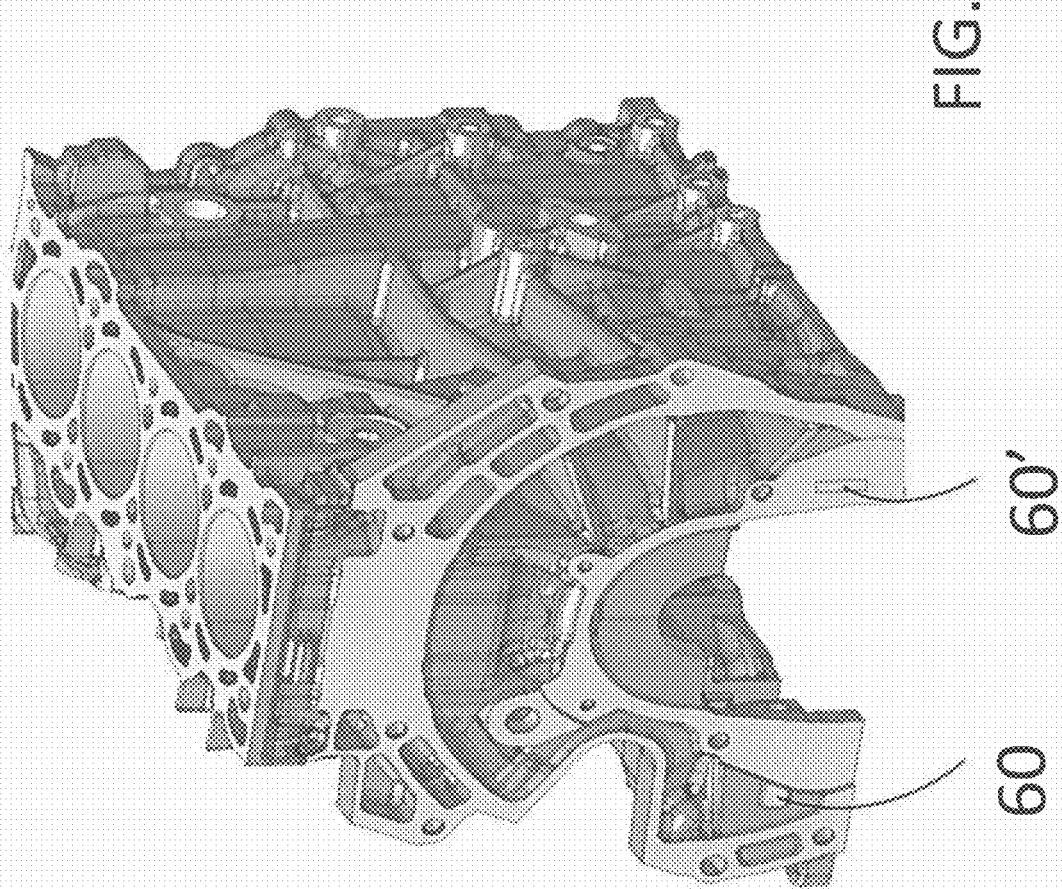
FIG. 10 is the same view of the engine block of FIG. 9 but illustrating the insert locators having been removed by machining.

The position of the vibration-damping rope inserts 60 and 60' within the engine block 80 is shown in FIGS. 8-10. In these figures, the vibration-damping rope inserts 60 and 60' are shown positioned on roughly the same plane at one end the engine block 80. The placement of the inserts can be varied as needed.

A portion of the engine block 80 having the vibration-damping rope inserts 60 and 60' positioned therein is illustrated in FIG. 8. The vibration-damping rope insert 60 includes an insert locator 64. The vibration-damping rope insert 60' includes an insert locator 64'. The insert locators 64 and 64' are relied upon to ensure that their associated rope inserts 60 and 60' respectively are properly positioned within the mold before casting. The rough cast engine block 80 is illustrated in its entirety in FIG. 9 in which the insert locators 64 and 64' are shown extending beyond the surface of the front of the engine block 80. Following machining, the insert locators 64 and 64' are removed as illustrated in FIG. 9, leaving only stubs.

While FIGS. 7-10 illustrate an engine casting that includes a vibration-damping rope insert, it is not necessary to use the insert to provide desired vibration damping. For example, and as illustrated in FIG. 11, one or more vibration-damping ropes may be positioned within the engine mold without being first formed in inserts. Referring to FIG. 11, a portion of an engine block 90 is illustrated in which three vibration-damping ropes 92, 92' and 92" are positioned. A greater or lesser number of ropes may be used and the ropes may be positioned at different locations in the engine block 90.

The rope 92 includes a plurality of wires 94 wrapped or otherwise encased in a metal sheathing 96. The rope 92' includes a plurality of wires 94' wrapped or otherwise encased in a metal sheathing 96'. And the rope 92" includes a plurality of wires 94" wrapped or otherwise encased in a metal sheathing 96".

As an additional non-limiting use of the vibration-damping ropes of the disclosed inventive concept, the ropes are suggested for use in an engine flywheel. In a conventional flywheel of the type shown in FIG. 12 generally illustrated in sectional view as 100, a flywheel body 102 having a starter ringer gear 104 is formed around a flywheel hub 104. A base plate 108 is formed adjacent the body 12 and commonly shares the hub 106. Because of its considerable mass and high rotational rate, the flywheel 100 is the source of a considerable amount of undesirable vibration.

To overcome the vibration of the flywheel by damping, the vibration-damping rope system of the disclosed inventive concept may be employed as illustrated in FIG. 13. Referring thereto, a flywheel 110 is shown in sectional view. The flywheel 110 includes a flywheel body 112 and an associated starter ring gear 114. The flywheel body 112 is formed around a central flywheel hub 116.

A base plate 118 that shares the central flywheel hub 116 is provided. To dampen vibration of the flywheel 110, one or more vibration-damping rope inserts may be cast therein. Particularly, and as shown in FIG. 13, a ring-shaped insert 120 is formed within the base plate 118. The ring-shaped insert 120 includes an inner vibration-damping rope 122 in the form of a ring and an outer vibration-damping rope 124 in the form of a ring. A greater or lesser number of ropes may be employed.

The inner vibration-damping rope 122 includes a metal sheathing 126 that wraps around or otherwise encases a plurality of wires 128. The outer vibration-damping rope 124 includes a metal sheathing 130 that wraps around or otherwise encases a plurality of wires 132.

In addition to the inner vibration-damping rope 122 and the outer vibration-damping rope 124 formed in the base plate 118, one or more additional vibration-damping ropes may be provided in different locations of the flywheel 110. For example, the vibration-damping rope may be provided in the body 112 of the flywheel 110 in the form of an insert 134 that includes a vibration-damping rope 136 in the form of a ring. The vibration-damping rope 136 includes a metal sheathing 138 that wraps around or otherwise encases a plurality of wires 140. Additional vibration-damping ropes may be strategically provided in other locations in the ring including further inboard of the body 112 than the position of the insert 134.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibration-dampener for use in a cast metal component comprising:
    a rope having first and second ends, said rope comprising a plurality of wires positioned next to one another, said first end and said second end are joined, thereby forming a rope ring; and
    a metal sheathing encasing said plurality of wires to form said rope, said sheathing having a melting point equal to or greater than the casting alloy, whereby sliding movement of the surfaces of the wires relative to one another dampens resonant vibration of the component;
    wherein said rope ring is embedded within a ring-shaped insert.

2. The vibration-dampener of claim 1 further including at least one locator tab attached to said rope and extending therefrom.

3. The vibration-dampener of claim 1 wherein said rope is formed within an insert which is cast in the cast metal component.

4. The vibration-dampener of claim 3 further including a locator tab extending from said insert.

5. The vibration-dampener of claim 1 wherein said wires are arranged linearly or helically.

6. The vibration-dampener of claim 1 wherein plural ring-shaped inserts are provided within the cast metal component.

7. A vibration-dampener for use in a cast metal component comprising:
    a rope having first and second ends, said rope comprising a plurality of wires positioned next to one another, said first end and second end are joined, thereby forming a rope ring; and
    a metal sheathing completely wrapped around said plurality of wires to form said rope, whereby sliding movement of the surfaces of the wires relative to one another dampens the resonant vibration of the component,
    wherein said rope ring is embedded within a ring-shaped insert.

8. The vibration-dampener of claim 7 in which said metal sheathing has a melting point equal to or greater than that of the casting alloy.

9. The vibration-dampener of claim 7 further including at least one locator tab attached to said rope and extending therefrom.

10. The vibration-dampener of claim 7 wherein said rope is formed within an insert which is cast in the cast metal component.

11. The vibration-dampener of claim 10 further including a locator tab extending from said insert.

12. The vibration-dampener of claim 7 wherein said wires are arranged linearly or helically.

13. The vibration-dampener of claim 7 wherein plural ring-shaped inserts are provided within the cast metal component.

* * * * *